United States Patent

Lund et al.

[11] 4,088,866
[45] May 9, 1978

[54] METHOD AND AN APPARATUS FOR AUTOMATIC ELECTRIC WELDING

[75] Inventors: Svend Aage Lund, Birkerod; Erik Kongshavn, Farum; Erik Ostgaard, Vaerlose, all of Denmark

[73] Assignee: Akademiet for de Tekniske Videnskaber, Svejsecentralen, Glostrup, Denmark

[21] Appl. No.: 726,139

[22] Filed: Sep. 24, 1976

Related U.S. Application Data

[63] Continuation of Ser. No. 551,969, Feb. 21, 1975, abandoned.

[30] Foreign Application Priority Data

Feb. 25, 1974 Denmark ............................ 1004/74

[51] Int. Cl.² .............................................. B23K 9/12
[52] U.S. Cl. .............................. 219/137 R; 219/137.7
[58] Field of Search ......... 219/137 R, 137 PS, 131 F, 219/130; 314/52, 62

[56] References Cited

U.S. PATENT DOCUMENTS 2,583,507 1/1952 Carpenter et al. ............. 219/137 PS
3,612,818 10/1971 Bechtle et al. .................... 219/131 F

FOREIGN PATENT DOCUMENTS

39-20929 9/1962 Japan .................................... 219/130
112-012 6/1948 Sweden ............................ 219/137 R Primary Examiner—J. V. Truhe
Assistant Examiner—Clifford C. Shaw
Attorney, Agent, or Firm—Schuyler, Birch, Swindler, McKie & Beckett

[57] ABSTRACT

When carrying out electric fusion welding with at least two current-carrying electrodes, these electrodes are held in a joint holder in non-parallel positions so that they meet in a point of intersecton in which melting of the electrode material takes place. Hereby the risk of burn-through is minimized and an additional degree of freedom which can be used for controlling purposes is obtained.

12 Claims, 4 Drawing Figures

METHOD AND AN APPARATUS FOR AUTOMATIC ELECTRIC WELDING

This is a continuation, of application Ser. No. 551,969, filed Feb. 21, 1975, now abandoned.

The invention relates to a method for automatic electric fusion welding of the kind where at least two current-carrying welding electrodes are used simultaneously, said electrodes being mounted in a joint holder which is moved manually or mechanically in relation to a work piece, and where at least one of the welding electrodes is a continuously melting electrode which is fed to the welding point by means of a mechanical feeding device.

Within welding technology, numerous methods are known and used for mechanized electric fusion welding comprising the use of one or more current-carrying continuously melting electrodes and a more or less automatic control of the welding process.

The methods are known and used in a long series of variants, in part with regard to the design of the continuously fed electrodes, which may be solid or cored, in the form of wires or strips, and bare or coated or flux-filled, and in part as regards the nature of the shielding used for the molten weld metal, which shielding can be carried out by means of a slag cover from a molten flux or by means of a shielding gas which is blown across the molten material.

The methods are furthermore known and used in different degrees of mechanization, either as semi-automatic processes in which a welding nozzle is moved manually in relation to a work piece while at the same time the welding electrode is fed mechanically through the welding nozzle, or as fully mechanized processes in which the movement of the welding nozzle in relation to the work piece as well as the feeding of the welding electrode to the welding point are effected mechanically.

With a view to achieving the highest possible welding rate, a series of methods have been developed where two or more welding electrodes are used simultaneously mounted in a joint holder which is moved as a total unit in relation to the work piece.

A feature common to all the said methods is the necessity of an automatic control of the melting process which can ensure a uniform melting of the welding electrodes and maintain an even flow of the desired amount of welding heat and molten material to the welding point.

In the case of the known methods, the necessary self-adjustment of the melting process is achieved by means of a feedback control which during the welding process constantly tends to maintain a predetermined distance between the melting end of the welding electrode and the surface of the molten pool formed on the surface of the work piece. This is achieved by means of an automatic control of the rate of feed for the welding electrode or of the electric power supplied in the form of the electric potential between the welding electrode and the work piece and the electric current flowing between the welding electrode and the work piece.

Thus, the methods so far known are based on an unavoidable linking together of said mechanical and electric parameters and may in conformity herewith be divided into two principal groups:

In the first group, which has particularly been applied in welding with covered electrodes and in welding with bare electrodes under flux cover, the electric potential present at any time between the welding electrode and the work piece is used for controlling the rate of feed of the welding electrode in such a way that said potential is constantly as far as possible maintained at a value set in advance. When this feedback control is used in combination with a welding power source having a drooping voltage-current characteristic curve, a total control of the melting process is obtained with a substantially maintained, constant distance from the tip of the electrode to the surface of the molten pool and with a substantially maintained, constant quantity of molten electrode metal per time unit.

In the other group, which has particularly been applied in welding with a shielding gas, a constant rate of feed for the welding electrode is used, after which the control of the distance from the tip of the electrode to the surface of the molten pool and the rate of melting are controlled purely electrically by the use of a constant-potential welding power source having a substantially flat current-voltage characteristic curve. By this means a feedback control effect is achieved so that random variations in the distance from the tip of the electrode to the surface of the molten pool and thereby in the electric potential between the welding electrode and the work piece are automatically compensated for by a change in the welding current and thereby in the rate of melting for the electrode fed at a constant rate. By a suitable choice of preset coordinated values of the welding parameters there will also in this case be achieved a total control of the melting process with a substantially maintained, constant distance from the melting end of the electrode to the surface of the molten pool and with a substantially maintained, constant quantity of molten electrode metal per time unit.

In prior art methods for fully mechanized fusion welding the welding speed, that is to say the speed of movement of the electrode holder in relation to the work piece, is set at a predetermined, constant value which thereupon, if necessary, has to be re-adjusted manually by the welding operator if random variations in the geometry of the welding groove or other conditions require a local change in the welding heat supplied or in the quantity of molten electrode metal per unit of length of the welded joint. In a few cases it has, however, been attempted to use sensors in the welding groove in front of the welding point in order thereby to obtain an expedient automatic regulation of the speed of movement of the electrode holder.

All the methods for automatic fusion welding described and known so far have, however, substantial shortcomings in respect of control, shortcomings which so far have prevented a complete command of and automation of the welding processes and which consequently have precluded the use of the methods from a number of desirable fields of application within modern highly productive welding industry.

These shortcomings must first and foremost be ascribed to the fact that the known methods are all based on a feedback control by which the distance from the melting end of the welding electrode to the surface of the molten pool is maintained constant. The result of this is necessarily that the electrode will always tend to follow a sagging molten pool. At any tendency towards an incipient burn-through of the welding groove and consequently towards a sagging of the molten pool the welding electrode will automatically follow so as to maintain the distance. The result of this is that the molten pool will be pressed further down, and this process continues until a total burn-through of the work piece occurs.

This undesirable consequence of the prior art methods presents very great difficulties in the production of welded joints with a regular and complete penetration throughout the thickness of the work piece in the case of highly productive one-sided automatic welding. Frequently, this forces the workshops to use a more time-consuming two-sided welding with the expensive turning of large work pieces, as e.g. complete welded ship's sections, deriving therefrom.

The unavoidable linking together of the mechanical and electric welding parameters in the case of the prior art control methods for the melting process proper in addition has the considerable drawback that there is no free control parameter at disposal for an automatic regulation of the preset welding heat flow and quantity of molten electrode metal per time unit, or for an automatic regulation of the speed of movement of the electrode holder and thereby of the welding heat deposited and the quantity of molten weld metal per unit of length of the welded joint in relation to random variations present in the cross-section of the welding groove.

Such random variations in cross-section, particularly variations in the gap between the two edges to be welded together, are unavoidable in practice in the production of large plate structures where the individual welded joints may be more than 20 m long. In the case of the prior art control methods, the result of these random variations is a correspondingly uneven penetration into and filling up of the welding grooves, and in order that this may be avoided the workshops are forced to perform an exceedingly accurate and very expensive pre-machining of the plate edges.

For the same reason, it has in practice been necessary to use a reduced electric welding power and a uneconomical low welding rate corresponding thereto. In addition, it has in certain cases been necessary to rely on a manual readjustment of the welding process according to the welding operator's subjective estimate of random variations in the cross-section of the welding groove, a method which is rather unreliable, in particular in the case of submerged arc welding where the welding arc, the molten pool and the total heated welding zone are completely concealed under a thick layer of welding flux.

Finally, the prior art methods present a considerable unreliability as regards the quality of the finished welded joints in the case of variations in groove dimensions, and this necessitates comprehensive inspection and time-consuming repair work after welding and thereby a welding productivity and economy that are essentially below the optimum result achievable in principle.

It is the object of the present invention to indicate a method for automatic electric fusion welding, which can be used in all the variants known per se and described above with regard to types of electrodes and ways of shielding the molten weld metal, which method permits a complete automation of the welding process as a whole, and which strongly reduces or completely eliminates the shortcomings mentioned above of the methods so far known and used.

According to the invention, this is achieved by the welding electrodes being mounted and fed at a relative angle of between 0° and 180° in such a way that they meet at a point of intersection where the melting of electrode material takes place.

Experiments have surprisingly proved it possible to maintain a stable joint melting in the point of intersection of the electrodes even by the use of conventional welding power sources, presumable because a protruding part, if any, of one of the electrodes is quickly melted away by the total current flowing from the electrodes to the work piece.

By the method according to the invention there is, as compared to the methods so far known for automatic fusion welding, firstly achieved the very essential advantage that the melting ends of the welding electrodes are now at any time during the course of the welding process kept at a point of intersection, or a line of intersection in the case of strip electrodes, which remains fixed in relation to the joint holder, and can therefore be kept in a stationary position at any required distance from the work piece quite independently of random variations in the position of the surface of the molten pool formed on the surface of the work piece.

By the release of the compulsory fixation, characteristic of prior art methods, of the distance from the tip of the electrode to the surface of the molten pool it has been possible completely to eliminate the very essential drawback that the electrode follows a sagging molten pool and via a self-increasing process can give rise to a total burn-through of the work piece.

Now, an incipient burn-through of the welding groove and a lowering of the molten pool deriving therefrom no longer leads to a self-increasing process, but only to a corresponding increase in the distance from the melting ends of the electrodes to the surface of the molten pool. The method according to the invention hereby creates quite new possibilities for the production of welded joints with a regular and complete penetration of work pieces in highly-productive automatic one-sided welding, which in turn may entail considerable advantages for the welding industry both as regards economy and production.

Secondly, by the method according to the invention the very essential advantage has been gained over the methods so far known that it has now become possible to have a free control parameter at disposal from the control of the melting process proper. This additional control parameter may then be used for the direct automatic control of the welding process as a whole, e.g. for automatically compensating for unavoidable local random variations in the cross-section of the welding groove.

The control parameter thus released may for example be used directly for controlling the welding rate, that is to say the speed of movement of the electrode holder in relation to the work piece, or for controlling the electric power supplied per unit of time as a function of random variations in the distance from the tips of the electrodes to the surface of the molten pool in such a way that the welding can be carried out with a filling up of the welding groove to a constant level in relation to the surface of the work piece irrespectively of random variations occurring in the cross-section of the groove.

The method according to the invention thus creates a series of new possibilities for fully automatic fusion welding within rational large-scale production with an optimization of the welding processes which may result in considerable advantages for the welding industry as regards both economy and production.

For the person skilled in the art within welding technology who is familiar with the technique known so far for automatic fusion welding and with the welding methods and feedback control methods, principles and apparatuses used within this field there will accordingly directly be created a long series of evident and obvious possibilities for carrying out the method according to the invention in practice.

When once the basic principle invented and described relating to the relative mounting of the electrodes and their feeding to the common point of intersection is known it will only be a matter of routine work for the person skilled in the art to apply the method expediently in practice within the numerous methods and processes, known per se, for automatic electric fusion welding, and the embodiments of the invention described here and in the following can therefore solely be regarded as illustrating examples and not as an exhaustive description of the possibilities of application as a whole of the method.

A particularly expedient embodiment of the method according to the invention is characterized in that the electric potential, present at any time during the welding process, between the welding electrodes is used by means of a feedback control for controlling the rate of feed of the melting ends of the electrodes in such a way that said potential is constantly as far as possible maintained at a preset value, which is preferably less than 10% of the potential used during the welding process between the electrodes and the work piece.

This offers an essentially increased guarantee that the tips of the electrodes will at any time during the welding process remain fixed at or in the immediate vicinity of the said point of intersection where the joint melting of electrode material takes place.

Even if it is possible, as mentioned above, to obtain a stable joint melting at the point of intersection, it will in many cases be expedient to add the feedback control to ensure that the electrodes, in case of random variations in the melting, will not move too far from the common point of melting.

In certain cases the feedback control will furthermore directly be capable of providing the above-mentioned free control parameter for controlling the welding process as a whole.

An expedient embodiment of the method according to the invention with the feedback control added to it is characterized in that said control of the rate of feed of the melting ends of the welding electrodes is performed by controlling the rate at which the mechanical feeding devices feed the electrodes to the welding point.

By this means, a particularly simple method is achieved for keeping the melting ends of the electrodes fixed at or in the immediate vicinity of the joint point of melting which is geometrically fixed in relation to the holder for the electrodes. At the same time the simplification is obtained that the new control according to the invention can be performed with the direct use of the same methods as are already known and have been tested in practice for automatic welding with arc voltage feedback control of the rate of feed of the electrodes.

Another expedient embodiment of the method according to the invention comprising the additional feedback control is characterized in that said control of the rate of feed of the melting ends of the welding electrodes is performed by controlling the intensity of the electric currents flowing through the electrodes and back through the work piece.

By this means, a particularly simple purely electric control is achieved for keeping the melting ends of the electrodes fixed at or in the immediate vicinity of the joint point of melting, which is geometrically fixed in relation to the holder for the electrodes. At the same time, the simplification is obtained that the new control according to the invention can be performed with the direct use of the same methods as are already known and have been tested in practice for automatic welding with constant electrode feeding rate in connection with the use of conventional power sources.

Still another expedient embodiment of the method according to the invention comprising the additional feedback control is characterized in that said control of the rate of feed of the melting ends of the welding electrodes is performed by controlling the speed at which the holder for the electrodes is moved in relation to the work piece.

By this means a particularly simple method is achieved for keeping the melting ends of the electrodes fixed at or in the immediate vicinity of the joint point of melting while at the same time a surprisingly simple method for automatically controlling the welding process as a whole is obtained. By the use of the prior art methods for controlling the melting rate of the electrodes on the basis of the electric potential between the electrodes and the work piece a total feedback control is achieved which ensures a constant penetration into and filling up of a welding groove irrespectively of random variations, if any, in the cross-section of the latter.

When the level of the surface of the molten pool rises, the distance from the molten pool to the electrodes is reduced. This causes the electric potential between the electrodes and the work piece to drop, and this in turn in a way known per se increases the melting rate of the electrodes. By this means, the melting ends of the electrodes are removed a slight distance from each other, and this increases the electric potential between the electrodes. According to the invention, this potential is used to increase the speed at which the holder for the electrodes is moved in relation to the work piece. This causes the electrodes to be moved forwards until they are situated above a point in the welding groove where the surface of the molten pool has not yet reached the level desired. By this means, the distance between the electrodes and the surface of the molten pool is increased thereby increasing the electric potential between the electrodes and the work piece. This causes a reduction of the melting rate of the electrodes, reduces the distance between the electrodes, reduces the electric potential between these two electrodes and thereby in turn reduces the speed at which the holder is moved in relation to the work piece until the surface of the molten pool has reached the level desired also in this place.

The feedback control process described above repeats itself automatically until the entire welding groove has been filled up to the level desired, irrespectively of local random variations, if any, in the cross-section of the groove.

A particularly expedient embodiment of the method according to the invention is characterized in that at any time during the welding process one of the electrodes is supplied with a welding current which produces a current density in the electrode material which is higher, preferably up to 25% higher, than the current densities which at the same time are produced in the remaining electrodes by the welding currents flowing through them.

This offers an essentially increased guarantee that the tips of the electrodes are at any time during the welding process kept fixed at or in the immediate vicinity of the point of intersection where the joint melting of the electrode material takes place.

When a higher current density is applied to one of the electrodes so that thereby it tends to melt more quickly than the remaining electrode or electrodes, a corresponding tendency to a bias is incorporated in the total melting process. The electrode or electrodes with lower current densities will constantly tend to pass the point of melting, but this causes the protruding parts to carry the total welding current whereby they are quickly melted away, so that the joint point of melting is kept geometrically fixed as desired.

If furthermore the additional feedback control mentioned above is used, the incorporated tendency to a bias in the total melting process will constantly cause the generation of a well-defined control signal in the form of an electric potential between the electrodes relative to each other.

Without such an incorporated bias, control signals are only generated on account of random variations in the release of drops of molten metal from the tips of the electrodes, and this offers a less stable and thereby less precise control.

A particularly expedient embodiment of the method according to the invention comprising the additional feedback control is characterized in that one of the electrodes is chosen to be so much thinner than the remaining electrodes and is melted at so low a welding current and at so low a feeding rate that it only contributes less than 10%, preferably less than 5%, of the total quantity of molten material per unit of time.

By this means, a particularly simple method is obtained for keeping the melting end of a single conventional welding electrode fixed at a point which is geometrically fixed in relation to the electrode holder. In this case, the thin electrode functions substantially only as a measuring electrode which senses and thereby via the feedback control keeps the melting end of the electrode supplying the greater part of molten material and electric power to the work piece, in a stationary position.

At the same time the simplification is obtained that the new control according to the invention can be performed with the direct use of conventional methods for automatic fusion welding which are already known and have been tested in practice and without any interference with the usual functions of these prior art methods.

Finally, a particularly expedient embodiment of the method according to the invention is characterized in that at least one of the electrodes is a nonconsumable electrode fixed in relation to the holder.

By this means, a particularly simple method is likewise obtained for keeping the melting end of a single conventional welding electrode fixed at a point which is geometrically fixed in relation to the electrode holder. If furthermore the additional feedback control described above is used, the nonconsumable electrode will also in this case function as a measuring electrode which senses and thereby via the feedback control keeps the melting end of the electrode, which supplies the molten material to the work piece, in a stationary position.

In the form here described the method will be particularly well suited for welding under an inert shielding gas, and the nonconsumable electrode, which is a manner known per se may consist of a refractory metal-ceramic material, will, besides functioning as a measuring electrode, at the same time, if it be desired, in the conventional manner be capable of transmitting the greater part or a substantial part of the electric heat power transmitted to the work piece.

The invention also relates to an apparatus for use in carrying out the method according to the invention, said apparatus comprising at least two current-carrying welding electrodes mounted in a joint holder which can be moved manually or mechanically in relation to a work piece and where at least one of the welding electrodes can be fed through a welding nozzle for continuous melting at a welding point by means of a mechanical feeding device, said apparatus being characterized in that the holder is arranged for holding the welding electrodes at a relative angle of between 0° and 180° in such a way that they meet at a point of intersection.

A particularly expedient embodiment of this apparatus is characterized in that the apparatus is provided with a feedback control device which via an electric potential measuring device is connected to the welding electrodes and which is so arranged that the electric potential between the welding electrodes occuring at any time during the welding process can be used for controlling the feeding rate of the melting ends of the electrodes in such a way that said potential is constantly as far as possible maintained at a preset value which preferably is less than 10% of the potential used during the welding process between the electrodes and the work piece.

This offers an essentially increased guarantee that the tips of the electrodes can at any time during the welding be kept fixed at or in the immediate vicinity of said point of intersection where the joint melting of the electrode material takes place.

An expedient embodiment of the apparatus according to the invention with the additional feedback control is characterized in that said feedback control device is connected to the mechanical feeding devices and is so arranged that said control of the rate of feed of the melting ends of the welding electrodes is performed by controlling the rate at which the electrodes are fed to the welding point.

By this means, a particularly simple embodiment is obtained, it being possible in a simple way to link the new feedback control device directly to the apparatuses for automatic welding which are already known and have been tested in practice for welding with arc voltage feedback control of the rate of feed of the electrodes.

Another expedient embodiment of the apparatus according to the invention with additional feedback control is characterized in that the feedback control device is connected to the welding power sources and is arranged in such a way that said control of the rate of feed of the melting ends of the welding electrodes is performed by controlling the intensity of the electric currents which flow through the electrodes and back through the work piece.

By this means, a particularly simple embodiment is likewise obtained, it being possible in this case in a simple way to link the new feedback control device directly together with the apparatuses for automatic welding which are already known and have been tested in practice for welding with constant rate of feed of the electrodes in connection with the use of conventional power sources.

Still another expedient embodiment of the apparatus according to the invention comprising the additional feedback control is characterized in that said feedback control device is connected to a mechanism for moving the holder for the electrodes and is so arranged that said control of the rate of feed of the melting ends of the welding electrodes is performed by controlling the speed at which the holder is moved in relation to the work piece.

By this means, a particularly simple embodiment of an apparatus with a total feedback control of the welding process as a whole is obtained, it being possible also in this case in a very simple way to link the new feedback control device directly together with the apparatuses, which are already known for conventional automatic fusion welding, and with the associated prior art mechanisms for moving holders for welding electrodes.

Finally, a particularly expedient embodiment of the apparatus according to the invention is characterized in that at least one of the electrodes is a nonconsumable electrode which is fixed in relation to the holder.

By this means, there is correspondingly obtained a particularly simple embodiment of an apparatus which is especially well suited for welding under an inert shielding gas and in particular with a single continously melting electrode, it being possible in a very simple way to link the new feedback control device and the nonconsumable electrode, which in a manner known per se may consist of a refractory metal-ceramic material, together directly with the apparatuses for automatic welding under a shielding gas which are already known and have been tested in practice.

Below, the invention will be explained in greater detail with reference to the drawing.

Figure 1:
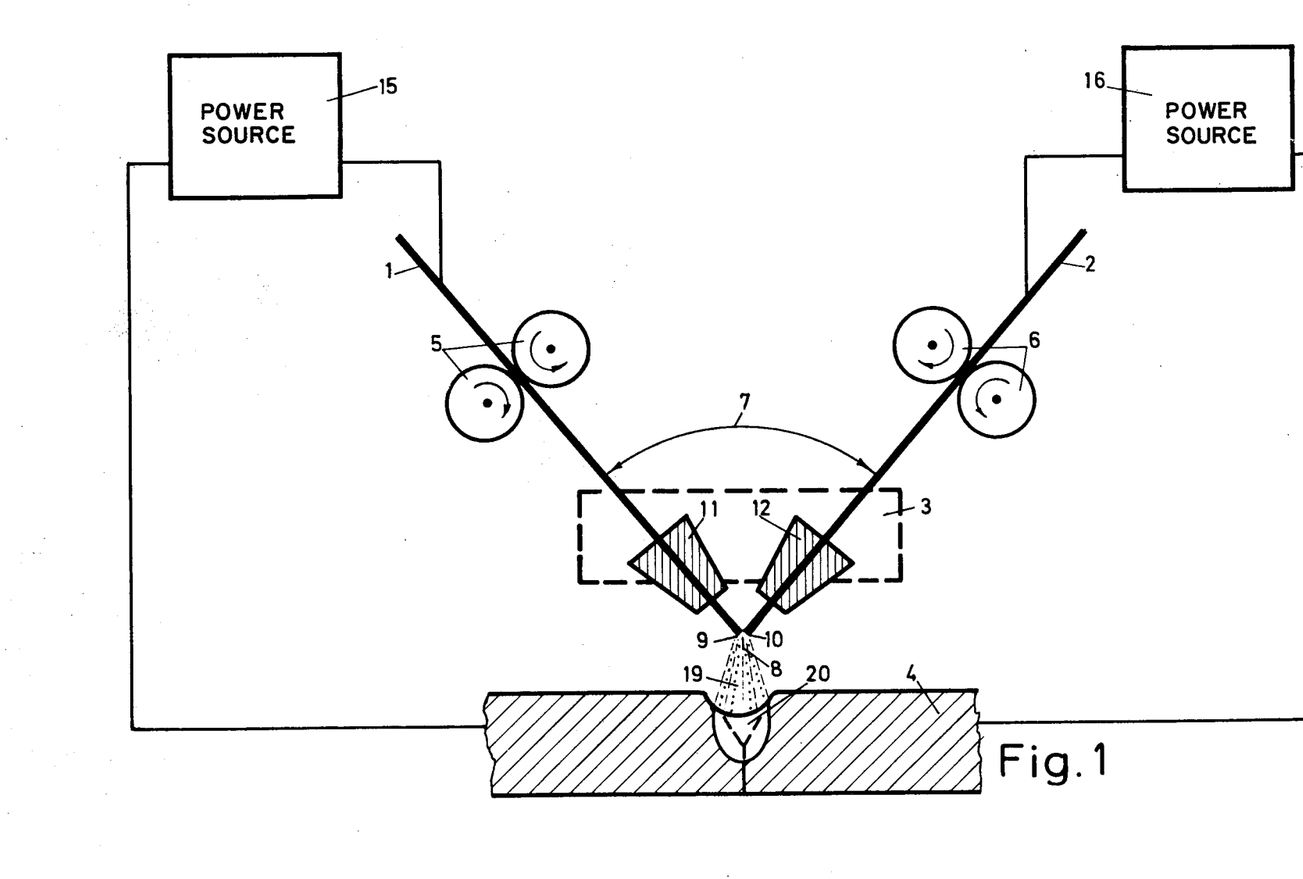
FIG. 1 diagrammatically illustrating the principle of the method for automatic electric fusion welding, FIG. 2 diagrammatically illustrating the principle of the method comprising an additional feedback control, FIG. 3 diagrammatically illustrating the principle of the invention comprising the use of a thin measuring electrode and FIG. 4 diagrammatically illustrating the principle of the method comprising the use of a nonconsumable electrode.

FIG. 1 diagrammatically illustrates the principle of a method for automatic electric fusion welding comprising the use of two current-carrying welding electrodes 1 and 2 which have the form of wires or strips and are mounted in a joint holder 3 which is moved manually or mechanically in relation to a work piece 4. The electric power for heating the electrodes and for melting electrode material off the melting ends 9 and 10 of the electrodes is supplied by welding power sources 15 and 16 which in the conventional manner feed an electric welding current through the electrodes, from these further on through an electrically conductive welding arc 19 or an electrically conductive pool of molten slag to the work piece 4 and back to the power sources 15 and 16. The welding electrodes 1 and 2 are in a conventional manner fed for being continously melted at the welding point through welding nozzles 11 and 12 in the holder 3 by means of mechanical feeding devices 5 and 6.

The method according to the invention is carried out in accordance with the following principle:

The welding electrodes 1 and 2 are mounted and fed at a relative angle 7 between 0° and 180° in such a way that they meet at a point of intersection 8 where the melting of electrode material takes place. In the case of electrodes 1 and 2 in the form of strips, the plane of which electrodes must be supposed to be at right angles to the plane of the paper, the point of intersection becomes a line of intersection 8 which is at right angles to the plane of the paper.

Hereby a joint point of melting 8 is formed which is geometrically fixed in relation to the holder 3 and from which the molten electrode material in the form of drops runs in a joint flow 19 to the work piece 4 and is deposited on the latter in a pool of molten material 20.

By this geometrical fixation of the point of melting 8 for the electrodes it becomes possible to maintain or control the distance from the melting ends 9 and 10 of electrodes to the work piece 4 as desired, quite independent of random variations in the position of the surface of the molten pool 20, and this feature is actually the main purpose of the invention.

At the same time, a free control parameter is achieved hereby, that is to say a control parameter which is no longer bound to the automatic control of the melting process proper and which consequently can be used freely for the automatic control of the welding process as a whole.

In the prior art methods for automatic electric fusion welding the total number of control parameters in the form of welding current, arc voltage between the tip of the electrode and the work piece, the rate of feed of the electrode towards the welding point as well as derivatives of the said parameters etc. are compulsorily linked together in a feedback control system which controls the melting process by maintaining the distance from the tip of the electrode to the surface of the molten pool at a value set in advance. If variations in this value or in the remaining parameters set in advance for the welding process as a whole are desired, they must consequently in the case of the prior art methods be performed manually by the welding operator during the course of the welding.

Thanks to the geometrical fixation of the joint point of melting 8 for the electrodes which is achieved by the method according to the invention said compulsory linking together of the total number of control parameters is eliminated, and one control parameter is released, which can be chosen substantially freely and which can be used for an expedient automatic control of one of the welding parameters which in the case of the prior art methods it has been necessary to adjust manually according to the welding operator's estimate.

By practical experiments with submerged arc welding with two electrodes in conformity with the method according to the invention it has in a convincing manner proved possible to achieve a stable geometrical fixation of the joint point of melting and an otherwise stable and regular welding process, when only the electrodes are fed at a so high rate of feed in relation to the electric power supplied that they constantly meet in the point of intersection 8. This surprising stability must be supposed to be based on the fact that the protruding end of an electrode, which tends to pass through the point of intersection, will, due to the electric contact with the other electrode, be made to carry the total welding current which from both electrodes flows to the work piece, and will therefore quickly melt away. Hereby an unexpected selfadjusting effect is produced which ensures that the melting ends 9 and 10 of the welding electrodes are kept fixed at or in the immediate vicinity of the joint point of melting 8.

FIG. 1 shows only a single illustrating example among the innumerable embodiments of the method according to the invention. For the person skilled in the art, who is familiar with the technique so far known for automatic fusion welding, it will be obvious to use the basic principle invented relating to the relative mounting of the electrodes and their feeding to the common point of melting in connection with all existing variants of electric fusion welding.

Thus, the welding electrodes 1 and 2 used may be of any known type, solid or cored, coated or bare, with or without a filling a flux, and the electrodes used simultaneously may be of the same type or of different types and have the same or relatively differing dimensions.

The shielding of the molten welding material 19 and 20 may likewise be of any known nature, such as a slag cover with a molten flux (bare metal arc welding, submerged arc welding, electro-slag welding etc.) or a shielding gas (argon arc welding, $CO_2$-welding, plasma welding, electrogas welding etc.).

The method according to the invention may furthermore be used for any known welding purposes, including welding of butt-, corner- and fillet welds as well as surfacing by welding a layer of weld metal onto the surface of a work piece.

The method may, as shown in FIG. 1, be carried out with the use of only two welding electrodes 1 and 2, but it is equally possible to use three or more electrodes simultaneously when only the latter, as indicated, meet at a joint point of intersection 8, and the individual electrodes may be fed and melted with the same or with relatively differing rates of feed and welding currents.

The relative angles 7 between the electrodes may be chosen freely between 0° and 180° when only a geometrically well-defined point of intersection 8 is established, and a possible third and fourth electrode need not be situated in the same plane as the two first electrodes.

The inclination of the electrodes in relation to the work piece 4 may be chosen freely from 0° to 90°, by which means a focusing of the flow of molten material 19 in any direction desired can be achieved.

The angles between the electrodes 1 and 2 and the direction of movement of the holder 3 in relation to the work piece 4 may, as indicated in the example in FIG. 1, be chosen to be 90°, but may, incidentally, be chosen freely from 0° to 180°.

The holder 3 with the welding nozzles 11 and 12 may be of any known type, and the movement of the holder 3 in relation to the work piece 4 may be performed manually or mechanically in any manner known per se, e.g. by means of a travelling carriage which travels directly on the surface of the work piece or on a separate rail arrangement.

The mechanical feeding devices 5 and 6 may be of any known type and may in a manner known per se be mounted in rigid connection with the holder 3 or be separated from the latter. The motive power for the feeding devices may in a manner known per se be obtained by means of electric motors with separate current supplies or with tappings from the welding power sources 15 and 16, or purely mechanically, e.g. by means of hydraulic or pneumatic motors.

The welding power sources 15 and 16 may be of any known D.C.- or A.C.-type with drooping current-voltage characteristic or of the constant potential or constant current type. As shown in FIG. 1, a separate power source may be used for each electrode, but it is equally possible to use a joint power source with separate tappings for the individual electrodes.

The feedback control of the rate of feed and the melting of the individual welding electrodes may be performed in any known manner, for example by a control based on the electric potential between the tips of the electrodes and the work piece controlling the rate of feed or the welding power, and the control principle may be the same for all electrodes or be different for each individual electrode of the number of electrodes used simultaneously.

The above-mentioned free control parameter, which is provided by the method according to the invention for welding with a geometrically fixed point of melting, offers the person skilled in the art numerous obvious possibilities of controlling the welding process as a whole.

The free control parameter may substantially be chosen freely among the different parameters incorporated in the prior art methods for controlling the melting process proper. The person skilled in the art will here be able to select the mechanical or electric parameter which will be most expedient in a given welding process and which will be able to produce the most well-defined and expedient control signal.

In turn, the person skilled in the art may freely choose to use this control signal for the automatic feedback control of one or more of the welding parameters which so far, in prior art methods, it has been necessary for the welding operator to adjust manually. This choice will depend on what will be most expedient in the case of a given welding process and a given welding task. As obvious examples may be mentioned the control of the speed at which the holder is moved in relation to the work piece, the control of the distance between the holder and the work piece or the control of a greater or smaller weaving movement for the holder for an expedient distribution of the welding heat in the work piece.

At the same time it will be obvious for the person skilled in the art in a manner known per se to use this new possibility of feedback control for an incorporated fully automatic optimization of the whole welding process, e.g. in order to obtain the maximum welding rate within limits set in advance for the permissible power supplied per unit of length of a welding joint.

Figure 2:
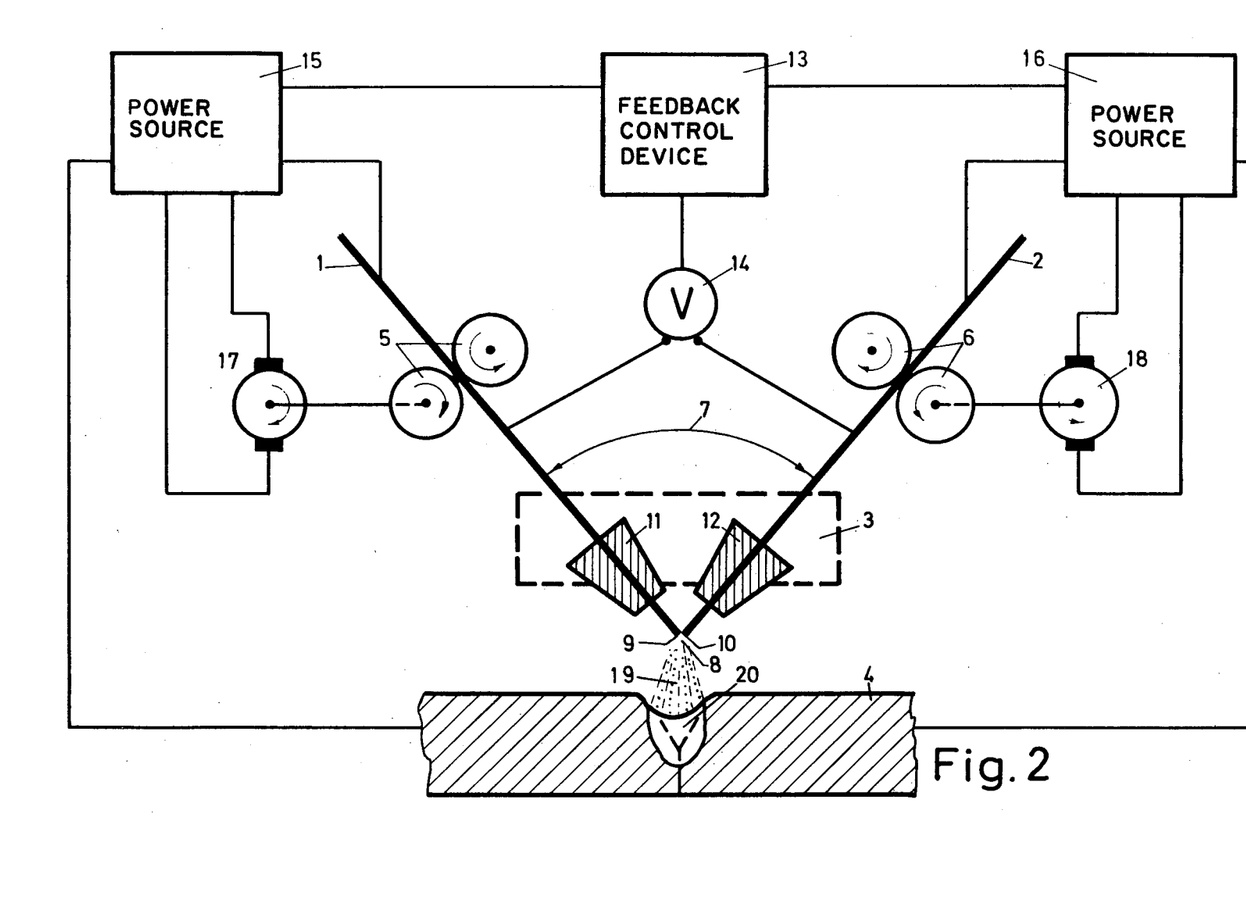

FIG. 2 diagrammatically shows the principle of a particularly expedient embodiment of the method according to the invention.

The illustrating example chosen in the same as in FIG. 1 apart from the fact that here a potential measuring device 14 has been added which is in electric connection with the welding electrodes 1 and 2 and with a feedback control device 13 which in turn is in connection with the welding power sources 15 and 16 and, via tappings on the latter, with electric motors 17 and 18 for the mechanical feeding devices 5 and 6.

The electric potential present at any time during the welding process between the welding electrodes 1 and 2 is measured currently and is used, in a manner known per se, as control signal in a feedback control of the rate of feed of the melting ends 9 and 10 of the electrodes 1 and 2 in such a way that said potential is constantly maintained as far as possible at a preset value.

By random variations in the release of drops of molten metal from the melting ends of the welding electrodes, corresponding random variations will occur in the distances from the tips 9 and 10 of the electrodes to the surface of the molten pool 20 produced on the surface of the work piece and consequently in the electric potentia's between the individual electrodes and the work piece. This in turn gives rise to random variations in the electric potential between the electrodes in relation to each other. The additional feedback control automatically compensates for these random variations, and when the reference value, set in advance for the feedback control, for the electric potential between the electrodes is set at a low value, preferably at less than 10% of the arc voltage between the electrodes 1 and 2 and the work piece 4, there will be a corresponding guarantee that the tips 9 and 10 of the electrodes will constantly be located at or in the immediate vicinity of the point of intersection 8.

The detailed principles for the design of the feedback control will be well-known to the person skilled in the art who is familiar with the prior art technique for the feedback control of electric welding processes in general. The feedback control may, for example, in a manner known per se function in such a way that variations in potential above or below the preset reference value produce corresponding increases or decreases in the preset rates of feed for the electrodes 1 and 2.

If in the case of a given task it is regarded as being more expedient, the feedback control may also function unilaterally, e.g. in such a way that any variation in potential from the preset reference value gives rise to an increase in the preset rates of feed for the electrodes, or possibly in such a way that variations in potential directly cause the feeding proper of the electrodes, in which case the motors 17 and 18 may be step motors.

In certain welding processes it will be expedient to use constant rates of feed for the electrodes and instead, in a manner known per se, let the feedback control adjust the intensity of the welding current flowing through the electrodes 1 and 2 and back via the work piece 4. This influences the rate at which welding metal is melted off the electrodes, which in turn determines the rate of feed of the melting ends 9 and 10 of the electrodes 1 and 2.

Finally, it might be expedient to let the feedback control adjust the speed at which the holder 3 is moved in relation to the work piece 4. The result of this is, as mentioned above, a feedback control of the welding process as a whole which, firstly, ensures the geometrical fixation desired of the joint point of melting of the electrodes and, secondly, makes possible a filling up of welding material to a constant level desired irrespectively of random variations occurring in the geometry of the work piece.

Figure 3:
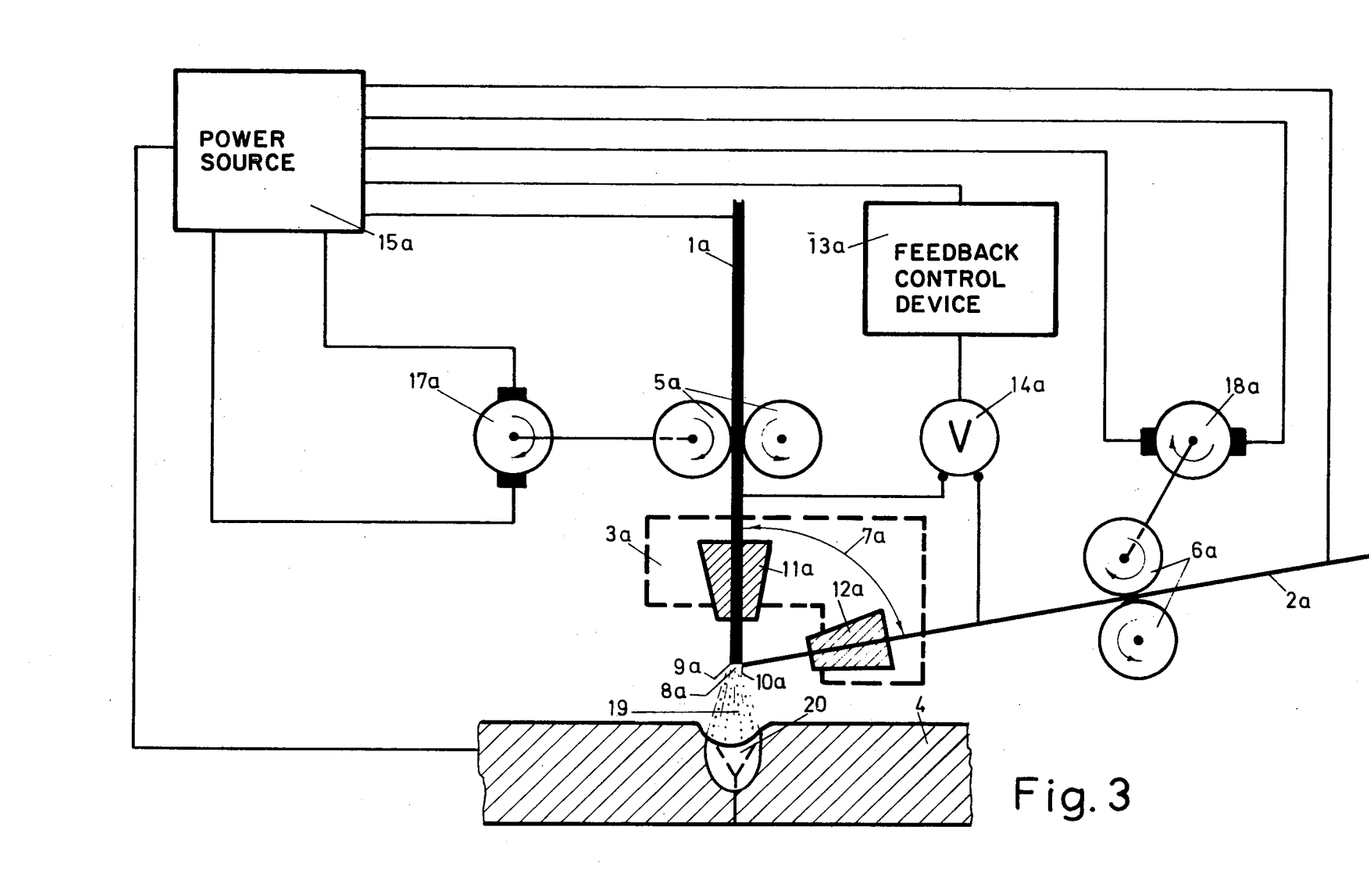

FIG. 3 diagrammatically shows the principle in still another particularly expedient embodiment of the method according to the invention.

In the illustrating example chosen two electrodes are used, one of which, 2a, is essentially thinner than the main electrode 1a. The electrodes are mounted at a relative angle 7a and are fed through the welding nozzles 11a and 12a in the holder 3a to the joint point of melting 8a by means of mechanical feeding devices 5a and 6a driven by the motors 17a and 18a.

In this example, the welding currents for the electrodes are supplied via separate tappings from a joint welding power source 15a which at the same time supplies current to the motors 17a and 18a. A potential measuring device 14a is in electric connection with the welding power source 15a and thereby with the motors 17a and 18a.

One of the electrodes 2a is chosen to be so much thinner than the main electrode 1a and is melted with so low a welding current and at so low a rate of feed that it only contributes less than 10%, preferably less than 5%, of the total quantity of molten material per unit of time.

In this way, the welding process will function in the normal way known per se in automatic fusion welding with a single electrode 1a with the addition, however, of a thin consumable measuring electrode 2a which does not interfere with the melting process in general, but which constantly by its melting end 10a senses and via the feedback control adjusts the position of the melting end 9a of the main electrode so that the latter is constantly kept fixed at the desired distance from the holder 3a independent of random variations in the distance from the tip 9a of the electrode to the surface of the molten pool 20 produced on the work piece 4.

Figure 4:
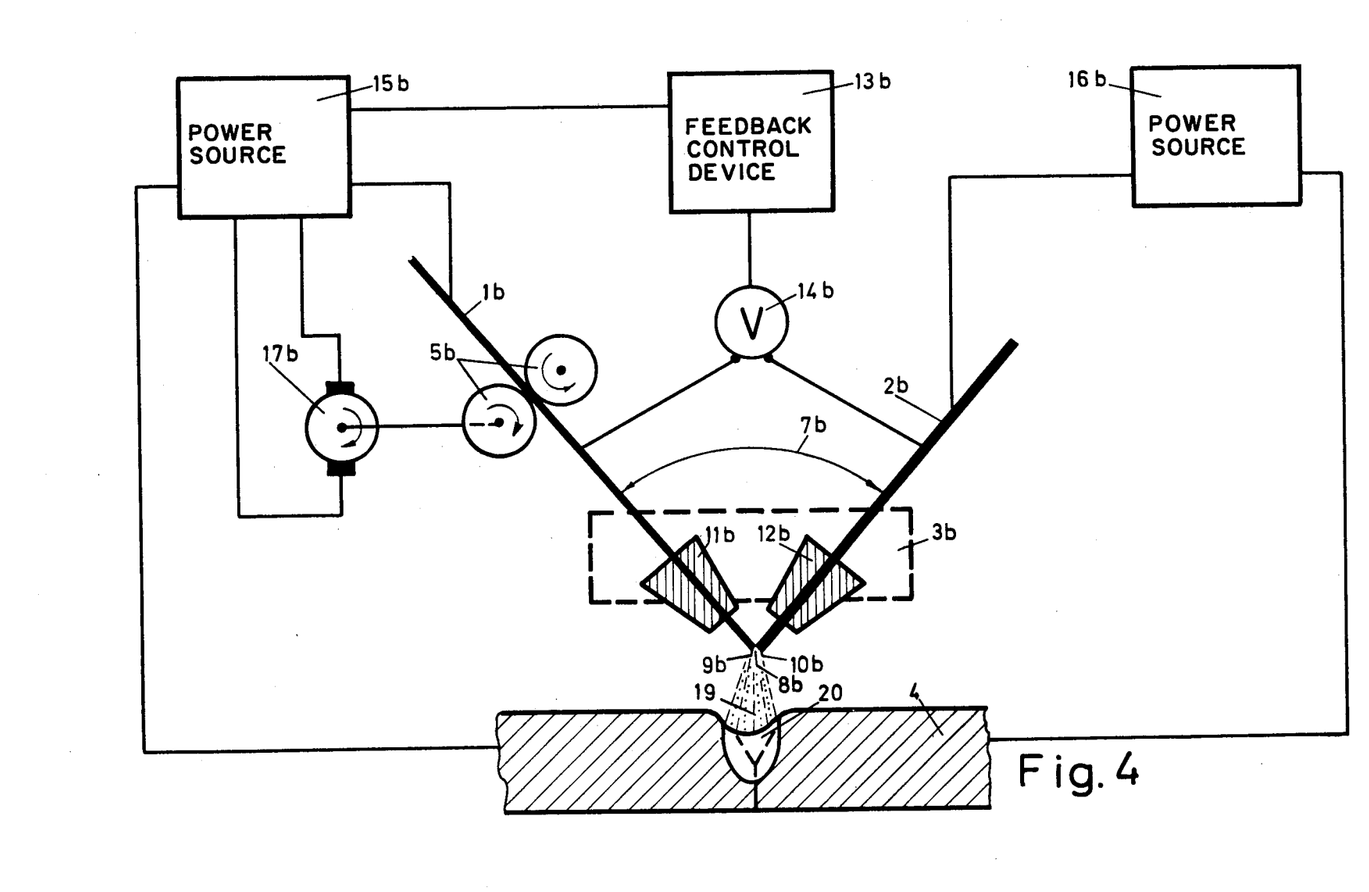

FIG. 4 diagrammatically shows the principle of a further particularly expedient embodiment of the method according to the invention.

In the illustrating example here chosen, two electrodes are used, one of which 1b is fed for being continuously melted at the welding point. The electrodes are mounted in the welding nozzles 11b and 12b in the holder 3b at a relative angle 7b, and the electrode 1b is fed to the point of intersection 8b with the electrode 2b by means of the mechanical feeding device 5b which is driven by the motor 17b.

In this example, the welding currents are supplied to the electrodes via separate welding power sources 15b and 16b, one of which 15b at the same time supplies current to the motor 17b. A potential measuring device 14b is in electric connection with the electrodes and with a feedback control device 13b which in turn is in connection with the welding power source 15b and thereby with the motor 17b.

One of the electrodes is chosen as a nonconsumable electrode 2b and is kept fixed in the welding nozzle 12b in such a position that the end surface 10b is located at or in the immediate vicinity of the point of intersection 8b with the other electrode 1b.

By this means, the welding process will function in the normal way known per se in automatic fusion welding with a nonconsumable electrode and with the addition of a further current-carrying consumable electrode which supplies the quantity of molten welding metal desired, but with the very essential improvement made possible by the present invention that the nonconsumable electrode 2b now at the same time functions as a measuring electrode which constantly by its tip 10b senses and via the feedback control adjusts the position of the melting end 9b of the consumable electrode, so that the latter is constantly, as far as possible, kept fixed at the desired distance from the holder 3b irrespectively of random variations in the distance from the tip 9b of the electrode to the surface of the molten pool 20 produced on the surface of the work piece 4.

FIGS. 1 to 4 at the same time indicate the arrangement in principle of the apparatuses invented for carrying out the methods according to the invention, and the components of the apparatuses and their mode of operation have been described in principle and in detail in the text accompanying said figures.

As regards the embodiments of the apparatuses according to the invention shown in the drawings and described above it has not been regarded necessary or expedient to offer further detailed directions for the arrangement, construction and mode of operation of the individual components, apparatuses and feedback control devices etc. These details are all included in the prior art technique and are used daily in practice. Further, they may be designed and combined in numerous different ways which are well-known and obvious to the person skilled in the art who is familiar with the technique known so far within the field of automatic electric fusion welding and with the welding and feedback control methods, principles and apparatuses ordinarily used within this field.

What is claimed is:

1. In a method for automatic electric fusion welding of a current-carrying workpiece wherein at least two current-carrying welding electrodes are used simultaneously, the electrodes being mounted in a joint holder which is movable in relation to the workpiece, and wherein at least one of the electrodes is a continuously melting electrode movable in relation to the joint holder by means of a feeding device, the improvement comprising:
   (a) mounting and feeding said electrodes at a relative angle of between 0° and 180° in such a manner that the protruding ends of said electrodes are at least randomly in physical contact at a point of intersection where the melting of electrode material occurs, said point of intersection being substantially fixed in relation to said joint holder, whereby the physical contact at the point of intersection of the protruding ends of said electrodes is automatically and continuously reestablished by the mounting and feeding of said electrodes; and
   (b) applying an electric potential between each of said electrodes and said work piece so that current flows through the point of intersection of said protruding ends of said electrodes and said workpiece, whereby a joint arc is established between said electrodes and said workpiece.

2. The method of claim 1 comprising the additional step of controlling the position of said protruding ends of said electrodes by means of a feedback control, said feedback control responsive to electric potential differences occurring between said electrodes at any time during the welding process, said feedback control operative to maintain said electric potential differences occurring between said electrodes below a predetermined value, said predetermined value being less than 10 percent of the electric potential applied between each of said electrodes and said workpiece, whereby said feedback control speeds up the automatic reestablishment of physical contact at the point of intersection of said electrodes.

3. The method of claim 2, wherein the step of controlling the position of the protruding ends of said electrodes is performed by controlling the rate at which said feeding device feeds said electrodes.

4. The method of claim 2, wherein the step of controlling the position of the protruding ends of said electrodes is performed by:
   (a) feeding said electrodes at a substantially constant rate; and
   (b) controlling the intensity of the electric current which flows through said electrodes and said workpiece.

5. The method of claim 2, wherein the step of controlling the position of the protruding ends of said electrodes is preformed by controlling the speed at which said joint holder is moved in relation to said workpiece.

6. The method of claim 2, wherein one of said electrodes is thinner, carries a lower electric current, and is fed at a lower rate than the other of said electrodes, whereby said one electrode contributes less than 10 percent of the total quantity of molten material per unit of time as compared to the other of said electrodes.

7. The method of claim 1, wherein the electric current density of one of said electrodes is up to 25 percent higher than the electric current density of the other of said electrodes.

8. An apparatus for automatic electric fusion welding of a current-carrying workpiece, comprising:
   (a) a joint holder movable in relation to said workpiece;
   (b) at least two current-carrying welding electrodes mounted in said joint holder, whereby an electric potential may be applied between each of said electrodes and said workpiece so that current flows through said electrodes and said workpiece; and
   (c) a feeding device for moving at least one of said electrodes with respect to said joint holder, said joint holder and said feeding device so constructed and arranged as to feed said electrodes at a relative angle of between 0° and 180° in such a manner that the protruding ends of said electrodes are at least randomly in physical contact at a point of intersection where the melting of electrode material occurs, said point of intersection being substantially fixed in relation to said joint holder, whereby the physical contact at the point of intersection of the protruding ends of said electrodes is automatically and continuously reestablished by said feeding device and a joint arc is established between said electrodes and said workpiece.

9. The apparatus of claim 8, additionally comprising:
   (a) an electric potential measuring device in electrical communication with said electrodes; and
   (b) a feedback control device in electrical communication with said electric potential measuring device, whereby the position of the protruding ends of said electrodes may be controlled in response to electric potential differences occurring between said electrodes at any time during the welding process, said feedback control device operative to maintain said electric potential differences occurring between said electrodes below a predetermined value, said predetermined value being less than 10 percent of the electric potential applied between each of said electrodes and said workpiece, whereby said feedback control device speeds up the automatic reestablishment of physical contact at the point of intersection of said electrodes.

10. The apparatus of claim 9, wherein said feedback control device is in electrical communication with said feeding device, said feedback control device operating to control the position of the protruding ends of said electrodes by controlling the rate at which said feeding device feeds said electrodes.

11. The apparatus of claim 9, wherein said feedback control device is in electrical communication with a welding power source, said electrodes being fed to said point of intersection at a constant rate, and said feedback control device operating to control the position of the protruding ends of said electrodes by controlling the intensity of the electric current flowing through said electrodes and said workpiece.

12. The apparatus of claim 9, wherein said feedback control device is operatively connected to said joint holder, said feedback control device operating to control the position of the protruding ends of said electrodes by controlling the speed at which said joint holder is moved in relation to said workpiece.

* * * * *